(12) United States Patent
Avni et al.

(10) Patent No.: US 9,058,206 B2
(45) Date of Patent: Jun. 16, 2015

(54) SYSTEM, METHOD AND PROGRAM PRODUCT FOR DETERMINING EXECUTION FLOW OF THE SCHEDULER IN RESPONSE TO SETTING A SCHEDULER CONTROL VARIABLE BY THE DEBUGGER OR BY A PROCESSING ENTITY

(75) Inventors: Hillel Avni, Tel Aviv (IL); Serge Lamikhov, Rishon-Le-Zion (IL); Dov Levenglick, Herut (IL)

(73) Assignee: Freescale emiconductor, Inc., Austin, TX (US)

( * ) Notice: Subject to any disclaimer, the term of this patent is extended or adjusted under 35 U.S.C. 154(b) by 288 days.

(21) Appl. No.: 12/994,021

(22) PCT Filed: Jun. 19, 2008

(86) PCT No.: PCT/IB2008/052412
§ 371 (c)(1),
(2), (4) Date: Nov. 22, 2010

(87) PCT Pub. No.: WO2009/153619
PCT Pub. Date: Dec. 23, 2009

(65) Prior Publication Data
US 2011/0154344 A1     Jun. 23, 2011

(51) Int. Cl.
*G06F 9/46*     (2006.01)
*G06F 9/48*     (2006.01)
*G06F 11/36*     (2006.01)

(52) U.S. Cl.
CPC ............. *G06F 9/4881* (2013.01); *G06F 11/362* (2013.01); *G06F 11/3636* (2013.01); *G06F 11/3632* (2013.01)

(58) Field of Classification Search
CPC .............. G06F 11/362; G06F 11/3632; G06F 11/3636; G06F 9/4881; G06F 9/3836
USPC ................................... 718/102; 712/220, 227
See application file for complete search history.

(56) References Cited

U.S. PATENT DOCUMENTS

| 4,980,824 A | 12/1990 | Tulpule et al. |
| 5,247,677 A | 9/1993 | Welland et al. |

(Continued)

FOREIGN PATENT DOCUMENTS

| EP | 0473444 A | 3/1992 |
| EP | 0753812 A2 | 1/1997 |

(Continued)

OTHER PUBLICATIONS

Anderson J H et al: "Real-Time Scheduling on Multicore Platforms" Real-Time and Embedded Technology and Applications Symposium, 2006, Proceedings of the 12th IEEE San Jose, CA USA, Apr. 4-7, 2006, Piscataway, NJ, USA, IEEE, Apr. 4, 2006, pp. 179-190.

(Continued)

*Primary Examiner* — Meng An
*Assistant Examiner* — Abu Ghaffari

(57) ABSTRACT

A system, computer program and a method for debugging a system, the method includes: controlling, by a debugger, an execution flow of a processing entity; setting, by the debugger or the processing entity, a value of a scheduler control variable accessible by the scheduler; wherein the debugger is prevented from directly controlling an execution flow of a scheduler; and determining, by the scheduler, an execution flow of the scheduler in response to a value of the scheduler control variable.

18 Claims, 13 Drawing Sheets

(56) References Cited

U.S. PATENT DOCUMENTS

| | | | |
|---|---|---|---|
| 5,394,547 | A | 2/1995 | Correnti et al. |
| 6,085,215 | A | 7/2000 | Ramakrishnan et al. |
| 6,360,243 | B1 | 3/2002 | Lindsley et al. |
| 6,499,050 | B1 | 12/2002 | Boswell et al. |
| 6,625,635 | B1 | 9/2003 | Elnozahy |
| 6,934,741 | B2 | 8/2005 | Shavit et al. |
| 7,103,887 | B2 | 9/2006 | Shavit et al. |
| 7,124,404 | B1 | 10/2006 | Bebout et al. |
| 7,159,215 | B2 | 1/2007 | Shavit et al. |
| 7,370,326 | B2 | 5/2008 | Jones et al. |
| 7,512,724 | B1 | 3/2009 | Dennis et al. |
| 7,752,610 | B2 * | 7/2010 | Cabillic et al. .......... 717/148 |
| 2001/0034558 | A1 | 10/2001 | Hoskins |
| 2003/0005417 | A1 | 1/2003 | Gard et al. |
| 2003/0222912 | A1 * | 12/2003 | Fairweather .......... 345/763 |
| 2005/0188372 | A1 | 8/2005 | Inoue et al. |
| 2005/0188373 | A1 | 8/2005 | Inoue et al. |
| 2005/0223382 | A1 | 10/2005 | Lippett |
| 2005/0240924 | A1 | 10/2005 | Jones et al. |
| 2006/0037020 | A1 | 2/2006 | Accapadi et al. |
| 2006/0117274 | A1 * | 6/2006 | Tseng et al. .......... 716/1 |
| 2006/0130021 | A1 * | 6/2006 | Plum et al. .......... 717/140 |
| 2006/0161923 | A1 | 7/2006 | Ghoman et al. |
| 2006/0168254 | A1 | 7/2006 | Norton et al. |
| 2006/0179172 | A1 | 8/2006 | Ayinala et al. |
| 2007/0083871 | A1 | 4/2007 | McKenney |
| 2007/0143759 | A1 | 6/2007 | Ozgur et al. |
| 2007/0204268 | A1 | 8/2007 | Drepper |
| 2007/0220517 | A1 | 9/2007 | Lippett |
| 2007/0220525 | A1 | 9/2007 | State et al. |
| 2007/0277174 | A1 | 11/2007 | Cai et al. |
| 2008/0098207 | A1 * | 4/2008 | Reid et al. .......... 712/227 |
| 2008/0133897 | A1 * | 6/2008 | Reid et al. .......... 712/227 |
| 2009/0254902 | A1 | 10/2009 | Chen et al. |
| 2009/0288086 | A1 | 11/2009 | Ringseth et al. |
| 2009/0320032 | A1 | 12/2009 | Avni et al. |
| 2014/0026141 | A1 | 1/2014 | Lippett |

FOREIGN PATENT DOCUMENTS

| | | | |
|---|---|---|---|
| EP | 1770509 | A | 4/2007 |
| GB | 2355319 | A | 4/2001 |
| WO | 2008/050094 | A | 5/2008 |
| WO | 2009/153620 | A1 | 12/2009 |
| WO | 2009/153621 | A1 | 12/2009 |

OTHER PUBLICATIONS

International Search Report and Written Opinion correlating to PCT/IB2008/052412 dated Oct. 1, 2009.

Non-Final Office Action mailed Aug. 23, 2012 for U.S. Appl. No. 12/994,027, 46 pages.

Non-Final Office Action mailed Aug. 31, 2012 for U.S. Appl. No. 12/994,033, 38 pages.

Tanenbaum, A.S., "Modern Operating Systems," Second Edition, Jan. 1, 2002, Prentice Hall, US, printed from <<http://www.ittelkom.ac.id/staf/mhd/MateriKuliah/Sistem%20Operasi/Modern%20Operating%20Systems.pdf>> on Apr. 8, 2013, pp. 118-123, 192-196, 629-630, 638-651, and 669-675.

Final Office Action mailed Mar. 28, 2013 for U.S. Appl. No. 12/994,027, 30 pages.

Non-Final Office Action mailed Apr. 1, 2013 for U.S. Appl. No. 12/994,033, 31 pages.

Final Office Action mailed Oct. 17, 2013 for U.S. Appl. No. 12/994,033, 26 pages.

Office Action—US Application No. (MT11039ES) NFOA Feb. 28, 2014, 31 pgs.

Notice of Allowance mailed Oct. 3, 2014 for U.S. Appl. No. 12/994,027, 16 pages.

* cited by examiner

1100

SYSTEM, METHOD AND PROGRAM PRODUCT FOR DETERMINING EXECUTION FLOW OF THE SCHEDULER IN RESPONSE TO SETTING A SCHEDULER CONTROL VARIABLE BY THE DEBUGGER OR BY A PROCESSING ENTITY

FIELD OF THE INVENTION

The present invention relates to an integrated circuit and to methods for debugging a system.

BACKGROUND OF THE INVENTION

Multiple core systems require an allocation of tasks between multiple cores. Off-core schedulers can offload the scheduling burden from the cores but pose problems for debuggers. For example, debugging an off-core scheduler can require stopping the entire system—cores and scheduler. Yet for another example, the debuggers can not directly communicate with off-core scheduler and applications can not inspect data structures that are accessed by the off-core scheduler. Yet for a further example the substantially simultaneous stop of the cores and the off-core scheduler can require using two dedicated debuggers—one for the cores and one for the off-core scheduler. Thus a coherent debugging is hard to achieve.

SUMMARY OF THE PRESENT INVENTION

The present invention provides a method, a computer program product and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been found that using one or more scheduler starts and control indicators can provide a highly efficient manner to affect (in a direct and an indirect manner) the state of a scheduler and one or more cores. By checking a value of a It has been shown that by allowing the debugger or a processing entity (such as a core) to set a value of a scheduler control variable accessible by the scheduler and by allowing the scheduler to set a scheduler status indication (that can affect the debugger decision to perform a debugging session) the execution flow of the cores and the scheduler can be substantially synchronized.

Multiple Processing Entity System

Figure 1:
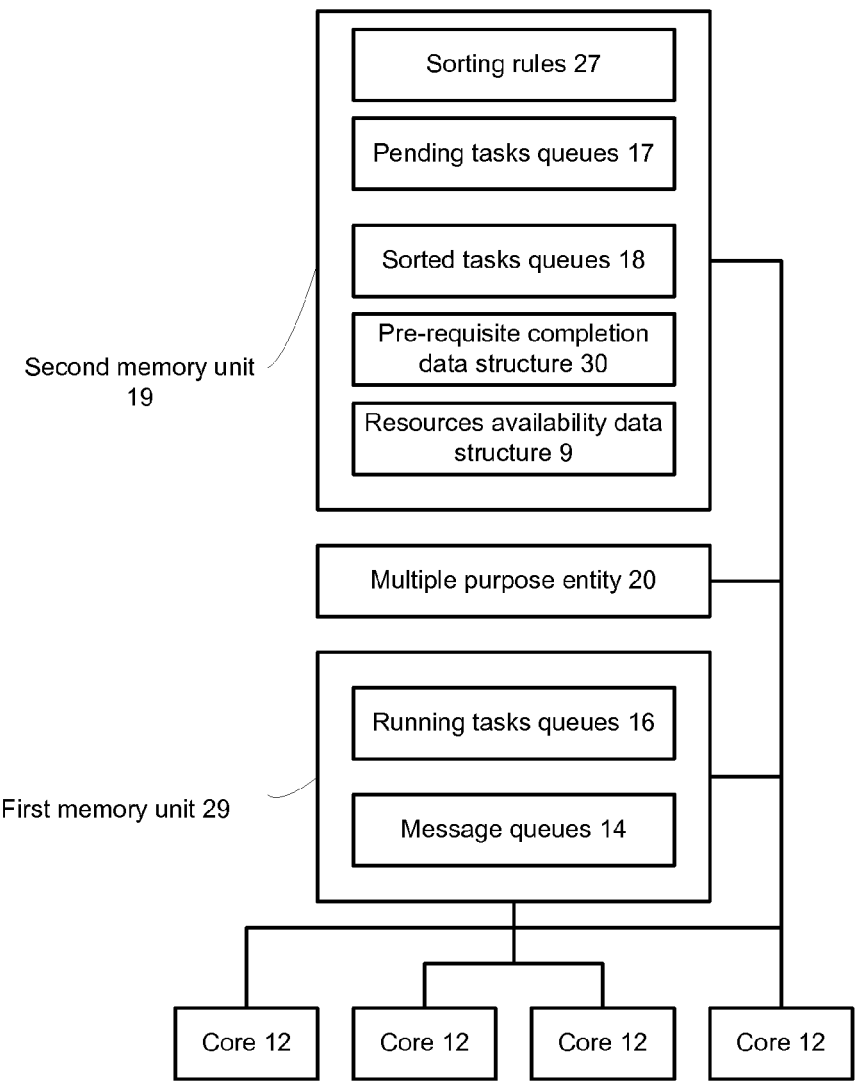
FIG. 1 schematically shows an example of an embodiment of a system.

FIG. 1 schematically shows an example of an embodiment of system 11.

System 11 includes multiple-processing entities such as multiple cores 12, multiple purpose entity 20, message queues 14 and memory units 19 and 29.

Each of the multiple processing entities can execute software and especially can provide task data structures and later on (at a time determined by the multiple purpose entity 20) can execute a task associated with a task data structure.

Figure 2:
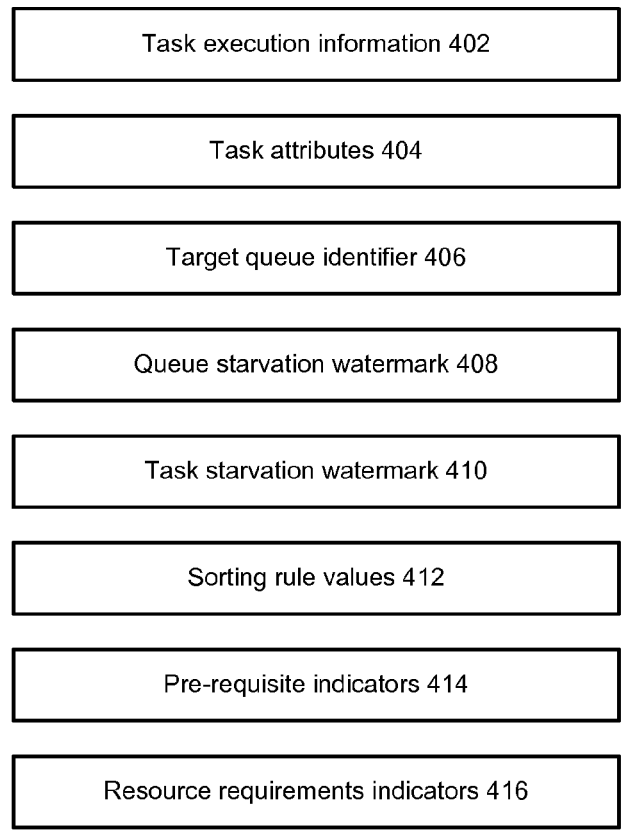
FIG. 2 schematically shows an example of a task data structure.

In the example of FIG. 2, task data structure 400 includes task execution information 402, task attributes 404, target queue identifier 406, queue starvation watermark 408, task starvation watermark 410, sorting rule values 412, pre-requisites indicators 414 and resource requirements indicators 416.

Task execution information and task attributes 404 includes information that enables a processing entity to execute a task. They can include instructions, data, pointers to instructions, pointers to data and the like. Each field can be stored in a buffer descriptor or point to a buffer descriptor.

Target queue identifier 406 is used to select queues in which the task data structure can be sent to. It can be an index (k) that indicates to which pending tasks queue (out of K pending task queues), to which sorted tasks queue (out of K sorted tasks queues), and to which running tasks queue (out of K running tasks queues) the task data structure should be sent to.

Queue starvation watermark 408 and task starvation watermark 410 are variables that assist in preventing or at least monitoring after task starvation. Their role is described in greater detail in relation to FIG. 3 and FIG. 4.

Sorting rule values 412 include a value per each sorting rule. Ascending or descending sorting rules (or other sorting rules) can be applied when sorting task data structures in sorted queues 18. The sorting can be executed by each scheduling iteration and head of queue task data structures (task data structures located at the head of each sorted queue) can be evaluated in order to determine whether they should be sent to a running tasks queue out of running tasks queues 16.

Pre-requisites indicators 414 indicate which pre-requisites should be fulfilled before a task data structure can be moved to a running tasks queue. These pre-requisites can include, for example, a completion of other tasks. These pre-requisites are known in advance and are typically not responsive to a temporal state of the system. The pre-requisite indicators 414 can form a vector that can be compared to a pre-requisite completion data structure such as data structure 30 in order to determine which pre-requisite is fulfilled. For example, a pre-requisite indicator that is set to '1' can indicate that the pre-requisite should be fulfilled before the task data structure can be moved to a running tasks queue.

Resource requirements indicators 416 indicate which resources (for example, communication channel, peripheral, memory space, availability of processing entity) should be available in order to enable an execution of a task. When all required resources are available and all the pre-requisites are fulfilled then the task data structure can be moved to a running task queue.

Multiple purpose entity 20 is adapted to schedule an execution of the tasks. It can determine when to place task data structure in a running tasks queue (out of multiple running tasks queues 16) that is accessible by one or more processing entities.

Multiple-purpose entity 20 can be a communication controller (such as but not limited to the Quicc Engine of Freescale) that is configured to perform the scheduling. It can be prevented from performing non-scheduler tasks during the scheduling. It can be re-programmed.

First memory unit 29 can store running tasks queues 16 and message queues 14. Second memory unit 19 can store pending tasks queues 17, sorted tasks queues 18 sorting rules 27.

Pre-requisite completion data structure 30 and resources availability data structure 9. Resources availability data structure 9 indicates which resources are currently available (either a Boolean value—yes or no, or a value indicative a level of availability, number of free bytes, amount of available bandwidth, and the like).

These data structures can be vectors.

Each message queue (of message queues 14) can be accessed only by a single processing entity and can be read only by the scheduler, thus simplifying the reading from and writing to that message queue. A processing entity can write to a message queue a task data structure or other information.

A task data structure includes multiple sorting rules values, multiple pre-requisite indicators and multiple resources requirements. An example of a task data structure is illustrated in FIG. 2.

Multiple purpose entity 20, after receiving such a task data structure, can remove, during the scheduling of tasks, the multiple pre-requisite indicators and the multiple resources requirements. These fields can be regarded as control fields as they assist in controlling the scheduling of these tasks.

A processing entity that is associated with the processing entity data structure can fetch the task data structures and then execute the task associated with the processing entity data structure.

The removal of the control fields can be done when the task data structure is moved from a sorted tasks queue to a running tasks queue or in a gradual manner. For example, multi-purpose entity 20 can: (i) remove the multiple pre-requisite indicators when the task data structure is moved to a sorted tasks queue; and (ii) remove the multiple pre-requisite indicators and the multiple resources requirements before the task data structure is fetched by a processing entity.

Multiple purpose entity 20 can be adapted to determine that a task data structure is not eligible to move to a running tasks queue that is associated with a sorted tasks queue if the running tasks queue is full or if at least one pre-requisite to a provision of the task data structure to the associated running tasks queue is not fulfilled.

Multiple purpose entity 20 can sort task data structures within each sorted tasks queue, during each scheduling iteration, according to multiple sorting rules values of each of the task data structures. Each sorting rule can be an ascending sorting rule or a descending sorting rule.

Each task data structure can include multiple pre-requisite indicators and multiple purpose entity 20 can be adapted to move the task data structure to a sorted tasks queue when all pre-requisites identified by the multiple pre-requisite indicators are fulfilled.

Each task data structure can include multiple resources requirements and a processing entity can be allowed to fetch the task data structure when all resources identified by the multiple resources requirements are available.

Multiple purpose entity 20 can be adapted to send to a single running task queue a sequence of task data structures that are similar to each other.

Multiple purpose entity 20 can be adapted to select which element will perform the scheduling out of a dedicated scheduler and the multiple purpose entity.

Figure 3:
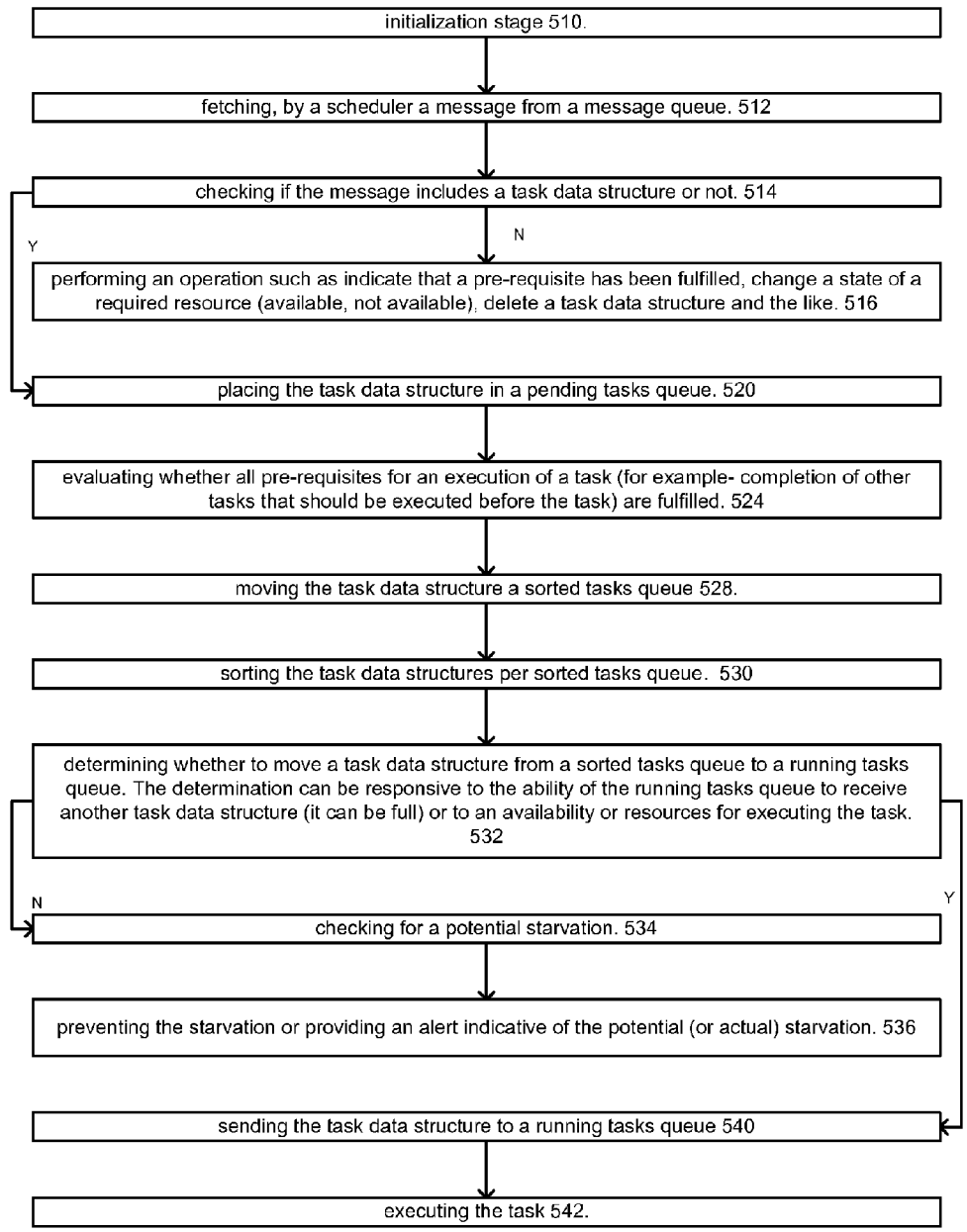
FIG. 3 schematically shows an example of an embodiment of a method.

FIG. 3 schematically shows an example of an embodiment of method 500 for scheduling tasks.

Method 500 starts by initialization stage 510.

Stage 510 is followed by stage 512 of fetching, by a scheduler a message from a message queue. The message queue can be read by the scheduler and written by only one processing entity—but this is not necessarily so.

Stage 512 is followed by stage 514 of checking if the message includes a task data structure or not. If not, stage 514 is followed by stage 516 of performing an operation such as indicating that a pre-requisite has been fulfilled, changing a state of a required resource (available, not available), deleting a task data structure and the like.

If the message includes a task data structure then stage 514 is followed by stage 520 of placing the task data structure in a pending tasks queue. The pending tasks queue can be selected by a target queue identifier of the task data structure.

Stage 520 can require an allocation of a vacant memory space and using this vacant memory space to store the task data structure.

Stage 520 is followed by stage 524 of evaluating whether all pre-requisites for an execution of a task (for example, completion of other tasks that should be executed before the task) are fulfilled. If the answer is positive then task data structure can be moved to a sorted tasks queue, as illustrated by stage 528.

Alternatively, the task data structure can be moved to the sorted tasks queue and the data structure is moved from the sorted tasks queue to a running tasks queue only if all pre-requisites are fulfilled.

Stage 528 is followed by stage 530 of sorting the task data structures per sorted tasks queue. If one or more sorted tasks queue are frozen, its task data structures do not participate in the sorting. A sorted tasks queue can be temporarily frozen due to a potential task starvation.

Stage 530 is followed by stage 532 of determining whether to move a task data structure from a sorted tasks queue to a running tasks queue. The determination can be responsive to the ability of the running tasks queue to receive another task data structure (it can be full) or to an availability or resources for executing the task.

If the answer is negative (the task data structure can not be moved) then stage 532 is followed by stage 534 of checking for a potential starvation.

If a potential starvation occurs or can occur then stage 534 is followed by stage 536 of preventing the starvation or providing an alert indicative of the potential (or actual) starvation.

Else, stage 532 is followed by sending the task data structure to a running tasks queue and executing it, as indicated by stage 540 and 542.

Figure 4:
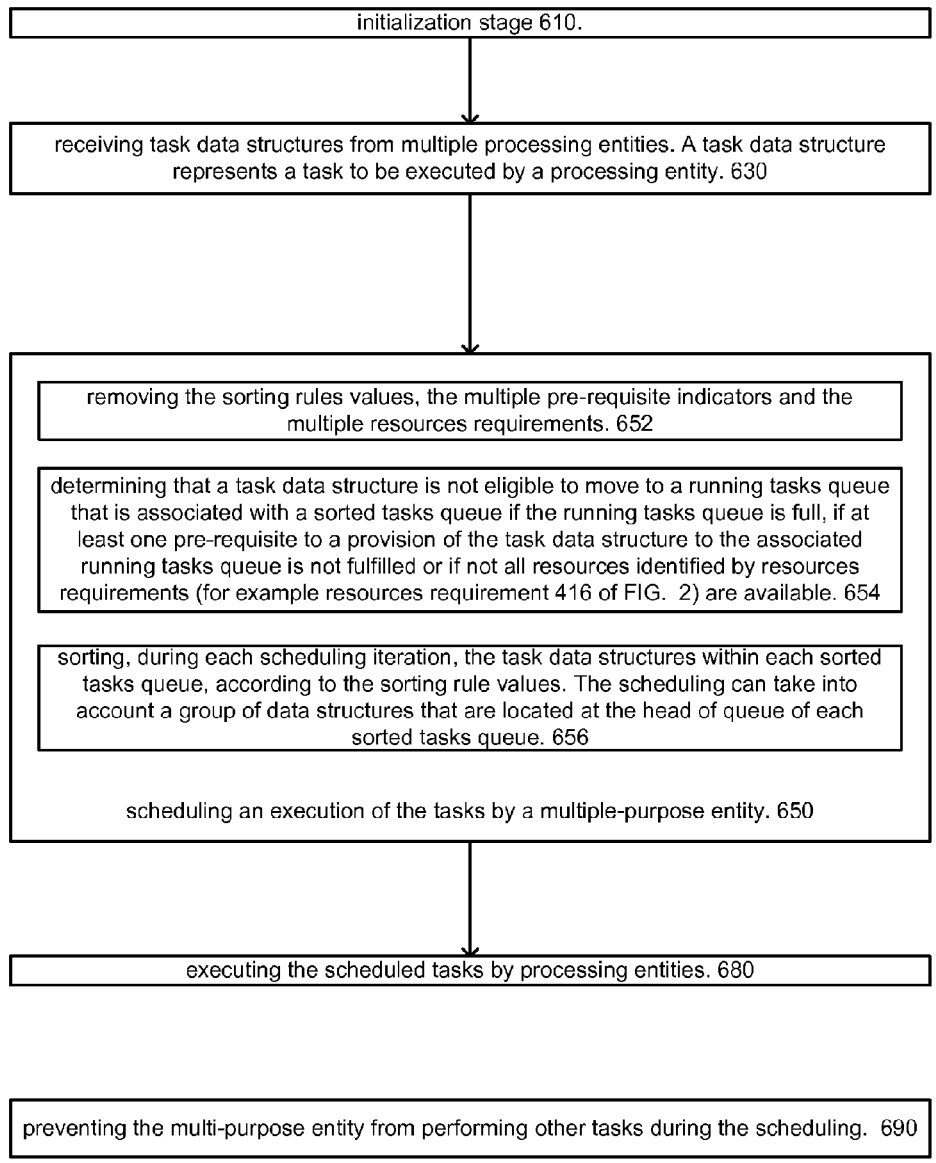
FIG. 4 schematically shows an example of an embodiment of a method.

FIG. 4 schematically shows an example of an embodiment of method 600 for scheduling processor entity tasks in a multiple-processing entity system.

Method 600 starts by initialization stage 610.

Stage 610 is followed by stage 630 of receiving task data structures from multiple processing entities. A task data structure represents a task to be executed by a processing entity. An example of a task data structure is illustrated in FIG. 2.

Stage 630 is followed by stage 650 of scheduling an execution of the tasks by a multiple-purpose entity. The multiple-purpose entity can be a non-dedicated scheduler—an entity that was not designed as a dedicated scheduler. It can be a processor, a DMA controller, a communication controller or other hardware component that has enough computational resources to perform the scheduling. It is not a core or a processing entity that is scheduled to execute the tasks. In this sense the scheduling of method 600 can be regarded as an off-core scheduling.

The multiple-purpose entity can be configured (in advance) to perform the scheduling. The configuration typically includes loading microcode or a set of instructions that will enable the multi-purpose entity to perform the scheduling.

The multi-purpose entity can be prevented from performing non-scheduler tasks during the scheduling. This prevention can simplify the configuration of the multi-purpose entity and can also be imposed by the amount of computational resources of the multi-purpose entity that are available (when scheduling) to perform other tasks. Accordingly, method 600 can include stage 690 of preventing the multi-purpose entity from performing other tasks during the scheduling.

Stage 630 of receiving task data structures can be simplified by allowing only a single processing entity to write a task data structure to a message queue, and allowing only the multiple-purpose entity to read from the message queue. This single reader single writer configuration eliminates complex locking or other resource sharing algorithms.

Stage 650 is followed by stage 680 of executing the scheduled tasks by processing entities.

Each task data structure can include multiple sorting rules values, multiple pre-requisite indicators and multiple resources requirements.

Stage 650 can include stage 652 of removing the sorting rules values, the multiple pre-requisite indicators and the multiple resources requirements. After the removal, the task data structure (that includes task execution information 402 and task attributes 404) is sent to running tasks queue 16 that is indicated by target queue identifier 406. Processing entity can then fetch a task data structure that includes the task execution information 402 and the task attributes 404. The removal can be executed when a task data structure is moved from a sorted tasks queue to a ready to run queue.

Stage 650 can include stage 654 of determining that a task data structure is not eligible to move to a running tasks queue that is associated with a sorted tasks queue if the running tasks queue is full, if at least one pre-requisite to a provision of the task data structure to the associated running tasks queue is not fulfilled or if not all resources identified by resources requirements (for example resources requirement 416 of FIG. 2) are available.

Stage 650 can include stage 656 of sorting, during each scheduling iteration, the task data structures within each sorted tasks queue, according to the sorting rule values. The scheduling can take into account a group of data structures that are located at the head of the queue of each sorted tasks queue. It is noted that method 600 can also include executing scheduled algorithms that take into account non-head of queue task data structures.

Stage 656 of sorting can be applied in view of sorting rule values (412) of the task data structures within each sorted tasks queue, and according to sorting rules. A sorting rule can be an ascending sorting rule or a descending sorting rule. Using numerical sorting values and allowing the user to determine these values as well as ascending or descending policies provides the user a very flexible sorting mechanism.

A task data structure can be initially generated by one processing entity and can be executed by the same processing entity or by another processing entity. One or more queue (for example, running tasks queue, sorted tasks queue) can be allocated per processing entity, although this is not necessarily so. For example, the running tasks queues can be shared queues. The provision of multiple queues and the assignment of tasks queue identifier 406 can enable control of which processing entity will execute which task. This can enable the user to preserve software affinity (code and data affinity) and core affinity, for example by generating and sending to a single running tasks queue (associated with a certain processing entity) a sequence of task data structures that are similar to each other.

Method 600 can be executed by a system that includes a dedicated scheduler (that is not one of the multiple processing entities), and a multiple purpose entity. In this case stage 610 can include selecting which element will perform the scheduling out of a dedicated scheduler and the multiple purpose entity. The selection can be responsive to the availability of each of these resources.

Any stages of any mentioned above methods can be executed by a computer (such as a processing entity, a scheduler or both) that executed instructions. The instructions can be stored in a computer readable medium of a computer program product. The computer readable medium can store instructions for: receiving task data structures from multiple processing entities; wherein a task data structure represents a task to be executed by a processing entity; and scheduling an execution of the tasks by a multiple-purpose entity.

The computer readable medium can store instructions for configuring the communication controller to perform the scheduling.

The computer readable medium can store instructions for preventing multi-purpose entity from performing non-scheduler tasks during the scheduling.

The computer readable medium can store instructions for allowing only a single processing entity to write a task data structure to a message queue, and allowing only the multiple-purpose entity to read from the message queue.

The computer readable medium can store instructions for removing the sorting rules values, the multiple pre-requisite indicators and the multiple resources requirements; fetching the processing entity data structure by a processing entity; and executing the task associated with the processing entity data structure, by the processing entity.

The computer readable medium can store instructions for removing the multiple pre-requisite indicators when the task data structure is moved to a sorted tasks queue; and removing the multiple pre-requisite indicators and the multiple resources requirements before the task data structure is fetched by the processing entity.

The computer readable medium can store instructions for determining that a task data structure is not eligible to move to a running tasks queue that is associated with a sorted tasks queue if the running tasks queue is full or if at least one pre-requisite to a provision of the task data structure to the associated running tasks queue is not fulfilled. The group of data structures comprises a head of queue task data structure per each sorted tasks queue.

The computer readable medium can store instructions for sorting task data structures within each sorted tasks queue, during each scheduling iteration, according to multiple sorting rules values of each of the task data structures; wherein each sorting rule can be an ascending sorting rule or a descending sorting rule.

The computer readable medium can store instructions for moving the task data structure to a sorted tasks queue when all pre-requisites identified by the multiple pre-requisite indicators are fulfilled.

The computer readable medium can store instructions for allowing a processing entity to fetch the task data structure when all resources identified by the multiple resources requirements are available.

The computer readable medium can store instructions for sending to a single running tasks queue a sequence of task data structures that are similar to each other.

The computer readable medium can store instructions for selecting which element will perform the scheduling out of a dedicated scheduler and the multiple purpose entity.

Figure 13:
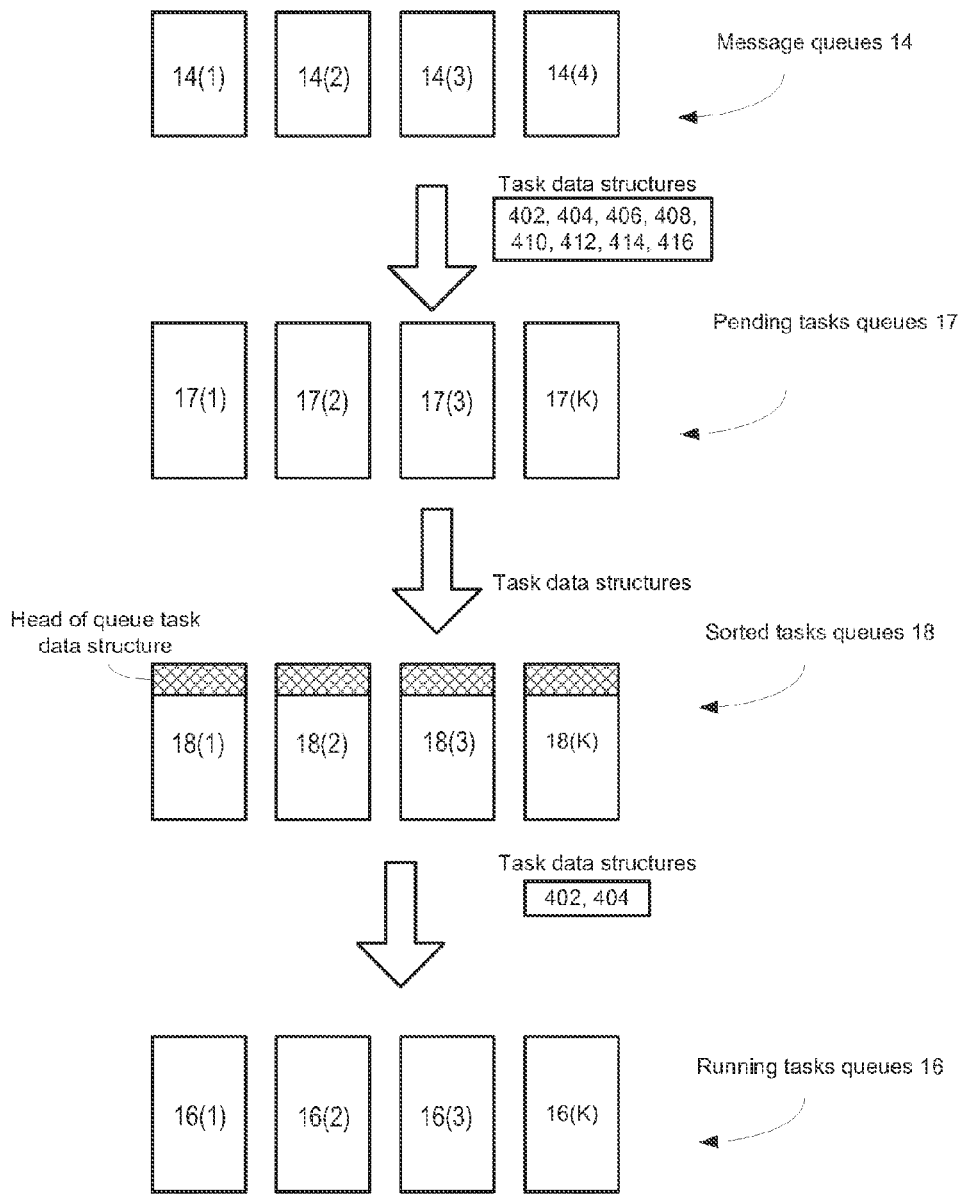
FIG. 13 schematically shows an example of an embodiment of task data structures and multiple queues.

FIG. 13 illustrates task data structures that first include fields 402, 404, 406, 408, 410, 412, 414 and 416 that are sent from message queues 14(1)-14(4) to K pending tasks queues 17(1)-17(K), to sorted tasks queues 18(1)-18(K) and finally to running tasks queues 16(1)-16(K). The task data structures sent to running tasks queues 16(1)-16(K) include fields such as fields 402 and 404.

Design Process

Figure 5:
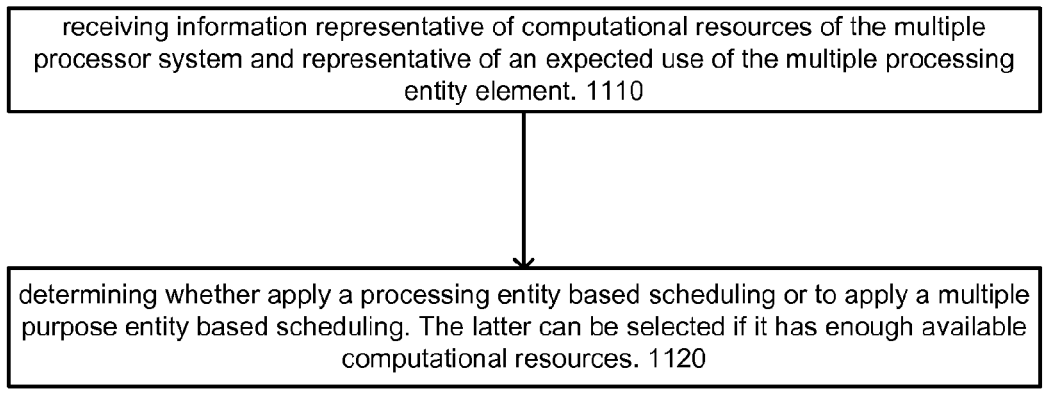
FIG. 5 schematically shows an example of an embodiment of a method.

FIG. 5 schematically shows an example of an embodiment of method 1100 for designing a multiple processing entity system.

Method 1100 starts by stage 1110 of receiving information representative of computational resources of the multiple processor system and representative of an expected use of the multiple processing entity element.

The system can be designed to execute various applications or can be targeted to different markets. For example, a system can be designed to operate in either the voice over IP market, video market or wireless base band station. In the voice over IP market and the video market one or more computational resources (such as a communication controller) can be configured to perform off-core scheduling.

In some markets more computational resources are used in relation to other markets, and while in some markets a multiple purpose entity has enough available resources to perform an off-core scheduling algorithm, in other markets it is not available.

Stage 1110 is followed by stage 1120 of determining whether apply a processing entity based scheduling or to apply a multiple purpose entity based scheduling. The latter can be selected if it has enough available computational resources.

Accordingly, stage 1120 can include determining whether apply an on-core based scheduling or to apply an off-core scheduling that utilizes the multiple purpose entity.

Any stages of method 1100 can be executed by a computer (such as a processing entity, a scheduler or both) that executed instructions. The instructions can be stored in a computer readable medium of a computer program product. The computer readable medium can store instructions for: receiving information representative of computational resources of the multiple processor system and representative of an expected use of the multiple processing entity element; and determining whether to apply a processing entity based scheduling or to apply a multiple purpose entity based scheduling.

The computer readable medium can store instructions for determining whether to apply an on-core based scheduling or to apply an off-core scheduling that utilizes the multiple purpose entity.

Task Starvation Management

Figure 6:
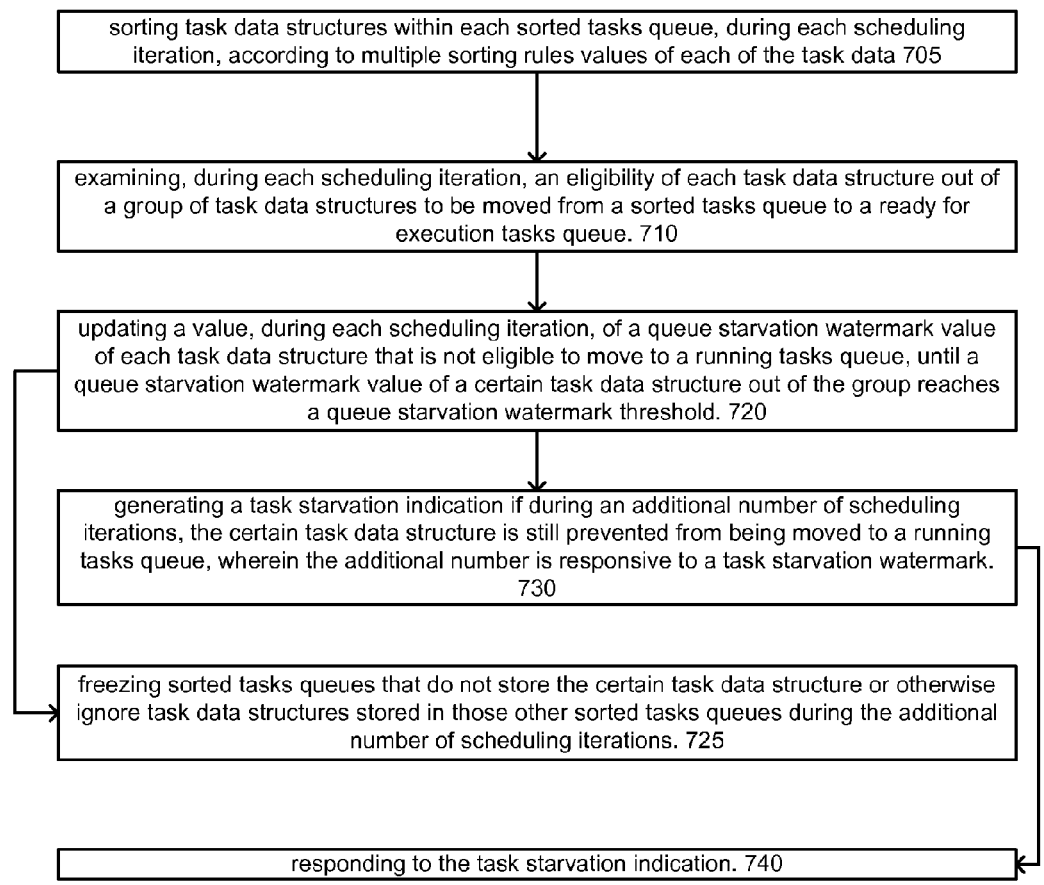
FIG. 6 schematically shows an example of an embodiment of a method.

FIG. 6 schematically shows an example of an embodiment of method 700 for preventing starvations of tasks in a multiple-processing entity system, according to an embodiment of the invention.

Method 700 starts by stage 705 of sorting task data structures within each sorted tasks queue, during each scheduling iteration, according to multiple sorting rules values of each of the task data structures.

Stage 705 is followed by stage 710 of examining, during each scheduling iteration, an eligibility of each task data structure out of a group of task data structures to be moved from a sorted tasks queue to a ready for execution tasks queue.

The group can include task data structures located at the head of each queue, wherein these queues can be sorted each scheduling iteration, each few scheduling iterations, multiple times per scheduling iterations, and the like. One or more queues can be temporarily frozen and stage 710 can be applied on the non-frozen queues.

Stage 710 is followed by stage 720 of updating a value, during each scheduling iteration, of a queue starvation watermark value of each task data structure that is not eligible to move to a running tasks queue, until a queue starvation watermark value of a certain task data structure out of the group reaches a queue starvation watermark threshold. Stage 720 can include reducing the queue starvation watermark until it reaches zero, but this is not necessarily so.

Stage 720 is followed by stage 730 of generating a task starvation indication if during an additional number of scheduling iterations; the certain task data structure is still prevented from being moved to a running tasks queue, wherein the additional number is responsive to a task starvation watermark.

Stage 720 can also be followed by stage 725 of freezing sorted tasks queues that do not store the certain task data structure or otherwise ignore task data structures stored in those other sorted tasks queues during the additional number of scheduling iterations.

Stages 725 and 730 can be followed by stage 740 of responding to the task starvation indication. Stage 740 can include, for example: (i) sending an interrupt request to at least two processing entities out of the multiple processing entities of the multiple-processing entity system, (ii) sending an interrupt request to all the processing entities of the multiple-processing entity system, (iii) sending the task starvation indication (in an interruptible or in a non-interruptible manner) to at least one processing entity out of the multiple processing entities of the multiple-processing entity system.

Additionally or alternatively, stage 740 can also include executing one or more (usually pre-programmed) actions such as resetting a system, re-starting one or more processing entity, stopping the operational flow of one or more of the processing entities, sending an alert to a user, taking over (or otherwise freeing) a resource that was not previously available, unfreezing frozen sorted tasks queues, and the like.

Stage 710 can include determining that a task data structure is not eligible to move to a running tasks queue that is associated with a sorted tasks queue if the running tasks queue is full or if at least one pre-requisite to a provision of the task data structure to the associated running tasks queue is not fulfilled.

Figure 7:
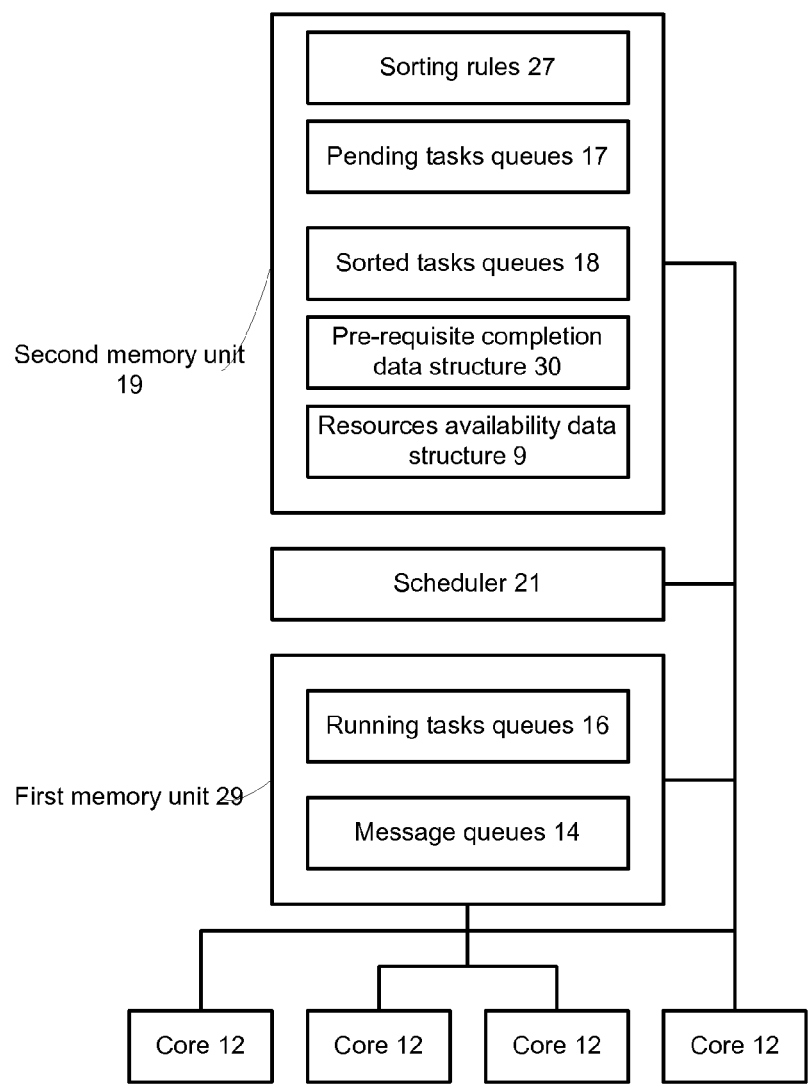
FIG. 7 schematically shows an example of an embodiment of a system.

FIG. 7 schematically shows an example of an embodiment of system 114, according to an embodiment of the invention.

System 114 of FIG. 7 can prevent starvations of tasks or otherwise indicate that a task starvation event occurs. System 114 includes scheduler 21 and multiple processing entities. The scheduler can be a dedicated scheduler or a non-dedicated scheduler such as multiple-purpose entity 20 of system 11. System 114 also includes various data structures such as but not limited to message queues 14, pending tasks queues 17, sorted tasks queues 18 and running tasks queues 16.

Scheduler 21 is adapted to schedule an execution of tasks; wherein the scheduler is further adapted to: (i) examine, during each scheduling iteration, an eligibility of each task data structure out of a group of data structures to be moved from a sorted tasks queue to a ready for execution task; (ii) update a value, during each scheduling iteration, of a queue starvation watermark value of each task data structure that is not eligible to move to a running tasks queue, until a queue starvation watermark value of a certain task data structure out of the group reaches a queue starvation watermark threshold; and (iii) generate a task starvation indication if during an additional number of scheduling iterations, the certain task data structure is still prevented from being moved to a running tasks queue, wherein the additional number is responsive to a task starvation watermark.

Scheduler 21 can be adapted to send an interrupt request to at least two processing entities out of the multiple processing entities of the multiple-processing entity system in response to the task starvation indication.

Scheduler 21 can be adapted to send the task starvation indication to at least one processing entity out of the multiple processing entities of the multiple-processing entity system.

Scheduler 21 can be adapted to send an interrupt request to all multiple processing entities of the multiple-processing entity system.

Scheduler 21 can be adapted to determine that a task data structure is not eligible to move to a running tasks queue that is associated with a sorted tasks queue if the running tasks queue is full or if at least one pre-requisite to a provision of the task data structure to the associated running tasks queue is not fulfilled. The group of data structures comprises a head of queue task data structure per each sorted tasks queue.

Scheduler 21 can be adapted to sort task data structures within each unfrozen sorted tasks queue, during each scheduling iteration, according to multiple sorting rules values of each of the task data structures; wherein each sorting rule can be an ascending sorting rule or a descending sorting rule.

Scheduler 21 can be adapted to sort task data structures within each unfrozen sorted tasks queue, during each scheduling iteration, according to multiple sorting rules values of each of the task data structures; wherein each sorting rule is either an ascending sorting rule or a descending sorting rule.

Scheduler 21 can be adapted to sort rules indicators that indicate, for each sorting rule, whether the sorting rule is an ascending sorting rule or a descending sorting rule.

Scheduler 21 can be adapted to sort task data structures within each unfrozen sorted tasks queue, during each scheduling iteration, according to hierarchical sorting rules.

Any stages of method 700 can be executed by a computer (such as a processing entity, a scheduler or both) that executed instructions. The instructions can be stored in a computer readable medium of a computer program product.

The computer readable medium can store instructions for: examining, during each scheduling iteration, an eligibility of each task data structure out of a group of data structures to be moved from a sorted tasks queue to a ready for execution task; updating a value, during each scheduling iteration, of a queue starvation watermark value of each task data structure that is not eligible to move to a running tasks queue, until a queue starvation watermark value of a certain task data structure out of the group reaches a queue starvation watermark threshold; and generating a task starvation indication if during an additional number of scheduling iterations, the certain task data structure is still prevented from being moved to a running tasks queue, wherein the additional number is responsive to a task starvation watermark.

The computer readable medium can store instructions for sending an interrupt request to at least two processing entities out of the multiple processing entities of the multiple-processing entity system.

The computer readable medium can store instructions for sending the task starvation indication to at least one processing entity out of the multiple processing entities of the multiple-processing entity system.

The computer readable medium can store instructions for sending an interrupt request to all multiple processing entities of the multiple-processing entity system in response to the task starvation indication.

The computer readable medium can store instructions for determining that a task data structure is not eligible to move to a running tasks queue that is associated with a sorted tasks queue if the running tasks queue is full or if at least one pre-requisite to a provision of the task data structure to the associated running tasks queue is not fulfilled. The group of data structures can include head of queue task data structure per each sorted tasks queue.

The computer readable medium can store instructions for sorting task data structures within each unfrozen sorted tasks queue, during each scheduling iteration, according to multiple sorting rules values of each of the task data structures; wherein each sorting rule can be an ascending sorting rule or a descending sorting rule.

The computer readable medium can store instructions for sorting task data structures within each unfrozen sorted tasks queue, during each scheduling iteration, according to multiple sorting rules values of each of the task data structures; wherein each sorting rule is either an ascending sorting rule or a descending sorting rule.

The computer readable medium can store instructions for receiving sorting rules indicators that indicate, for each sorting rule, whether the sorting rule is an ascending sorting rule or a descending sorting rule.

The computer readable medium can store instructions for sorting task data structures within each unfrozen sorted tasks queue, during each scheduling iteration, according to hierarchical sorting rules.

Peripheral Management

Figure 8:
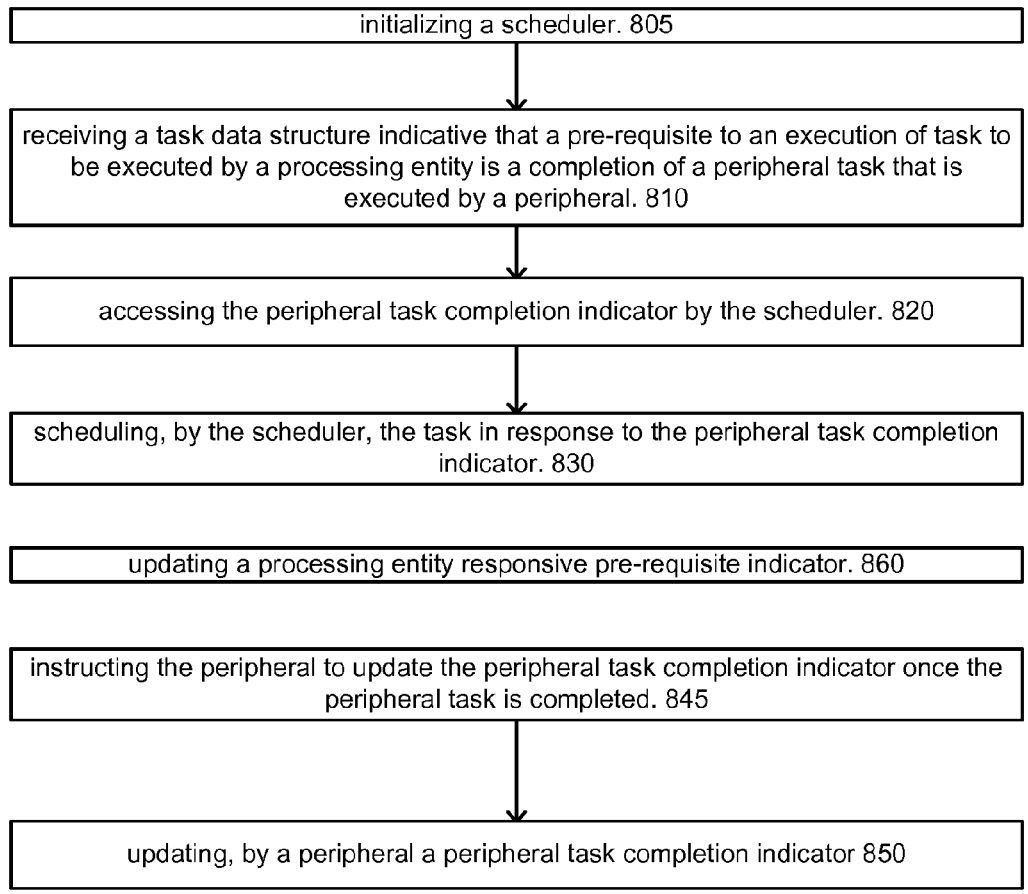
FIG. 8 schematically shows an example of an embodiment of a method.

FIG. 8 schematically shows an example of an embodiment of method 800 for scheduling a processing entity task in a multiple-processing entity system.

Method 800 starts by stage 805 of initializing a scheduler. This stage can include powering up a system that includes the scheduler, resetting the scheduler, providing initializing information to the scheduler and the like.

Stages 810, 820 and 830 of method 800 can be executed by a scheduler while some stages can be executed by the peripheral or a processing entity.

Method 800 starts by stage 810 of receiving a task data structure indicative that a pre-requisite to an execution of task to be executed by a processing entity is a completion of a peripheral task that is executed by a peripheral.

A peripheral task completion indicator can be updated by the peripheral once the peripheral task is completed. This update is represented by stage 850 of updating a peripheral task completion indicator by the peripheral once a peripheral task was completed.

Stage 810 is followed by stage 820 of accessing the peripheral task completion indicator by the scheduler.

Stage 820 is followed by stage 830 of scheduling, by the scheduler, the task in response to the peripheral task completion indicator.

Stage 820 can include accessing, by the scheduler, the peripheral task completion indicator, in a non-interruptible manner.

Stage 830 of scheduling can be responsive to other information such as but not limited to at least one processing entity editable pre-requisite indicator. A task data structure can include, for example, one or more processing entity responsive pre-requisite indicator such as pre-requisites 416 of FIG. 2.

The processing entity responsive pre-requisite indicator can be updated by the processing entity, either directly or indirectly. For example, a processing entity that is aware that a certain pre-requisite is fulfilled can instruct the scheduler to update the scheduler to update the processing entity responsive pre-requisite indicator, and additionally or alternatively can update the processing entity responsive pre-requisite indicator itself.

This update is illustrated by stage 860 of updating a processing entity responsive pre-requisite indicator.

The combination of stage 850 and 860 can provide an updating of a compact pre-requisite completion data structure, wherein a first portion of the compact pre-requisite completion data structure is accessible by the peripheral and wherein another portion of the compact pre-requisite completion data structure is responsive to information provided by at least one processing entity out of the multiple-processing entity of the multiple-processing entity system.

The combination of stage 850 and 860 can provide an updating of a pre-requisite completion vector, wherein a first portion of the vector is accessible by the peripheral and wherein another portion of the vector is responsive to information provided by at least one processing entity out of the multiple-processing entity of the multiple-processing entity system.

Stage 850 can be preceded by stage 845 of instructing the peripheral to update the peripheral task completion indicator once the peripheral task is completed. This instruction can be included in a task that preceded a task that its data structure is received during stage 810. For example, a processing entity can execute a certain task (denoted Task_a) that requires a peripheral to execute a certain peripheral task (Task_a_p). The peripheral can be instructed to update a peripheral task completion indicator once it completes task_a_p.

Another task of a processing entity (denoted Task_b) can be executed only after task_a_p is completed. In this case the scheduler will not schedule the execution of task_b by that processing entity until the update of the indicator.

Figure 9:
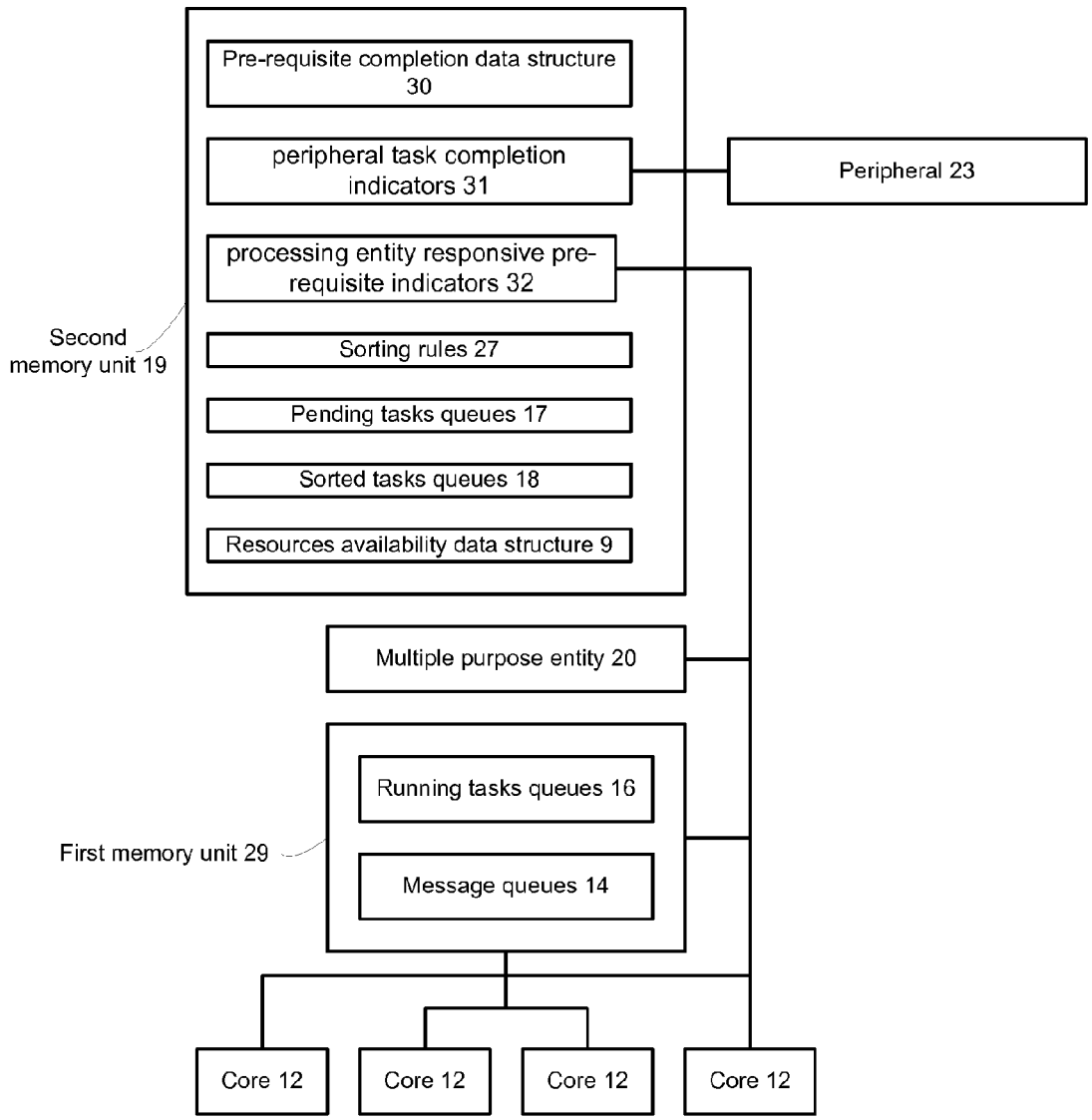
FIG. 9 schematically shows an example of an embodiment of a system.

FIG. 9 schematically shows an example of an embodiment of system 13. System 13 includes: peripheral 23, multiple processing entities such as cores 12, scheduler 21, first memory unit 29 and second memory unit 19. First memory unit 29 stores message queues 14 and running tasks queues 16. Second memory unit 19 stores pending tasks queues 17, sorted tasks queues 18, at least one peripheral task completion indicator such as PTCI 32, and at least one processing entity responsive pre-requisite indicator such as PER 31.

Second memory unit 19 adapted to store a task data structure (such as task data structure 400) indicative that a pre-requisite to an execution of task to be executed by a processing entity is a completion of a peripheral task that is executed by a peripheral. Peripheral 23 updates a peripheral task completion indicator (such as PTCI 32) once the peripheral task is completed. PTCI 32 is accessible by scheduler 21. Scheduler 21 is adapted to schedule the task (associated with the task data structure) in response to the peripheral task completion indicator.

Task data structure 400 includes multiple pre-requisite indicators 414. Some can point to one or more PTCI 32.

Scheduler 21 can access PTCI in a non-interruptible manner.

Scheduler 21 can schedule a task in response to the peripheral task completion indicator and in response to at least one processing entity editable pre-requisite indicator.

One or more peripheral task completion indicators (for example, one peripheral task completion indicators per peripheral) and one or more processing entity responsive pre-requisite indicators can be arranged in a compact pre-requisite completion data structure 30 such as but not limited to a vector. This compact representation eases memory management and simplifies the multiple pre-requisite evaluations that are executed per each scheduling iteration over multiple task data structures. The vector can include multiple bits—a bit per indicator but can also include multiple bits per indicator. When the indicator has a certain value the scheduler 21 knows that that pre-requisite is fulfilled and that a task data structure can (once all resources required for that task are available) be executed.

Accordingly one portion of the compact data structure 30 can be accessed by peripheral 23 and another portion of the compact pre-requisite completion data structure is accessible (or otherwise affected from) at least one processing entity out of the multiple-processing entity of the multiple-processing entity system. The other portion (30) can be updated by scheduler 21, after the scheduler 21 receives (via a message queue) an instruction to update it from a processing entity 12.

Scheduler 21 can move the task data structure from a pending tasks queue to a ready for execution tasks queue once all pre-requisites to the execution of the task are fulfilled.

Scheduler 21 can move the task data structure from the pending tasks queue to the ready for execution tasks queue before all pre-requisites are fulfilled, wherein the task data structure is moved to the running tasks queue only after all pre-requisites are fulfilled.

Scheduler 21 can be a multiple purpose entity such as scheduler 20 of system 11.

Peripheral 23 can be instructed, by a processing entity that executes a task, to update the peripheral task completion indicator once the peripheral task is completed.

Any stages of method 800 can be executed by a computer (such as a processing entity, a scheduler or both) that executed instructions. The instructions can be stored in a computer readable medium of a computer program product. The computer readable medium can store instructions for: receiving a task data structure indicative that a pre-requisite to an execution of task to be executed by a processing entity is a completion of a peripheral task that is executed by a peripheral; wherein the peripheral updates a peripheral task completion indicator once the peripheral task is completed; wherein the peripheral task completion indicator is accessible by a scheduler; and scheduling, by the scheduler, the task in response to the peripheral task completion indicator.

The computer readable medium can store instructions for accessing, by the scheduler, the peripheral task completion indicator, in a non-interruptible manner.

The computer readable medium can store instructions for scheduling the task in response to the peripheral task completion indicator and in response to at least one processing entity editable pre-requisite indicator.

The computer readable medium can store instructions for updating, a compact pre-requisite completion data structure, wherein a first portion of the compact pre-requisite completion data structure is accessible by the peripheral and wherein another portion of the compact pre-requisite completion data structure is accessible by at least one processing entity out of the multiple-processing entity of the multiple-processing entity system.

The computer readable medium can store instructions for updating, by the scheduler, a pre-requisite completion vector, wherein a first portion of the vector is accessible by the peripheral and wherein another portion of the vector is accessible by at least one processing entities out of the multiple-processing entity of the multiple-processing entity system.

The computer readable medium can store instructions for moving task data structure from a pending tasks queue to a ready for execution tasks queue once all pre-requisites to the execution of the task are fulfilled.

The computer readable medium can store instructions for instructing the peripheral to update the peripheral task completion indicator once the peripheral task is completed.

Debugging

Figure 10:
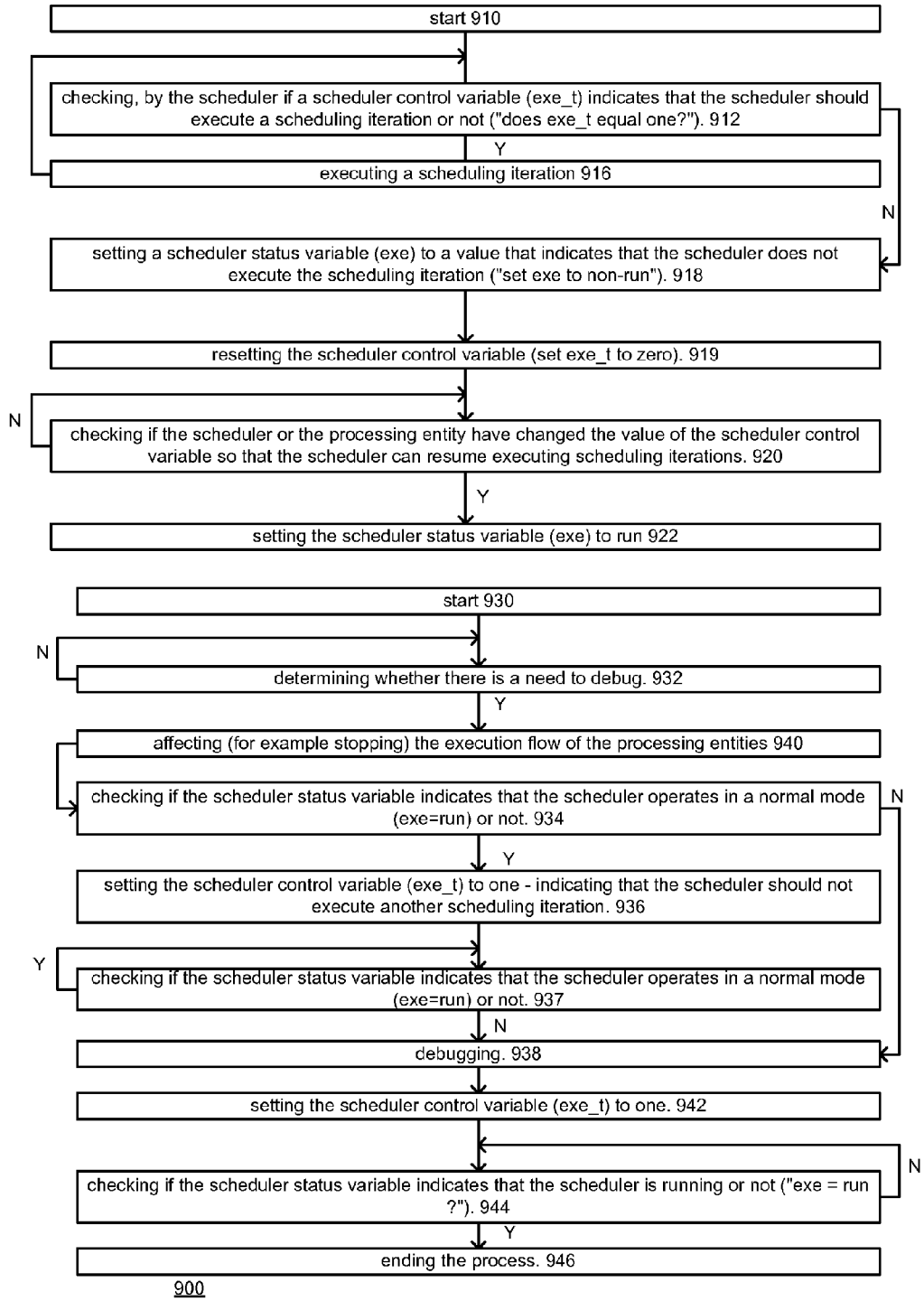
FIG. 10 schematically shows an example of an embodiment of a method.

FIG. 10 schematically shows an example of an embodiment of method 900 for debugging a system.

Method 900 includes stages 99, 912, 914, 916, 918, 919, 920, 922 and 924 that are executed by a scheduler and stages 930, 932, 934, 936, 938, 937, 940, 942, 944 and 946 that are executed by a debugger, a processing entity or both.

Stage 910 ("start") represents a beginning of a sequence of scheduler executed stages. The scheduler can not be controlled by the debugger and can be a multiple purpose entity (also referred to as a non-dedicated scheduler).

Stage 910 is followed by stage 912 of checking, by the scheduler if a scheduler control variable (exe_t) indicates that the scheduler should execute a scheduling iteration or not ("does exe_t equal one?"). Stage 912 can be followed by stage 916 of executing a scheduling iteration and jumping to stage 914 (if the answer is positive) or by stage 918 (if the answer is negative) of setting a scheduler status variable (exe) to a value that indicates that the scheduler does not execute the scheduling iteration ("set exe to non-run").

Stage 918 is followed by stage 919 of resetting the scheduler control variable (set exe_t to zero).

Stage 919 is followed by stage 920 of checking if the scheduler or the processing entity has changed the value of the scheduler control variable so that the scheduler can resume executing scheduling iterations. If the answer is positive then stage 920 is followed by stage 922 of setting the scheduler status variable (exe) to "run" and jumping to stage 916. Else, stage 920 is followed by itself.

Stage 930 (start) is followed by stage 932 of determining whether there is a need to debug. If the answer is negative stage 932 is followed by itself. Else (if there is a need to debug) stage 932 is followed by stage 940 of affecting (for example stopping) the execution flow of the processing entities.

Stage 940 is followed by stage 934 of checking if the scheduler status variable indicates that the scheduler operates in a normal mode (exe=run) or not. If that answer is positive then stage 934 is followed by stage 936 of setting the scheduler control variable (exe_t) to one—indicating that the scheduler should not execute another scheduling iteration. If the answer is negative (exe indicates that the scheduler is already in a "non-run" state) then stage 934 is followed by stage 938 of debugging.

Stage 936 is followed by stage 937 of checking if the scheduler status variable indicates that the scheduler operates in a normal mode (exe=run) or not. If the answer is positive, stage 937 is followed by itself, else—it is followed by stage 938.

Stage 938 of debugging is followed by stage 942 of setting the scheduler control variable (exe_t) to one.

Stage 942 is followed by optional stage 944 of checking if the scheduler status variable indicates that the scheduler is running or not ("exe=run?").

Stage 944 is followed by stage 946 of ending the process.

Figure 11:
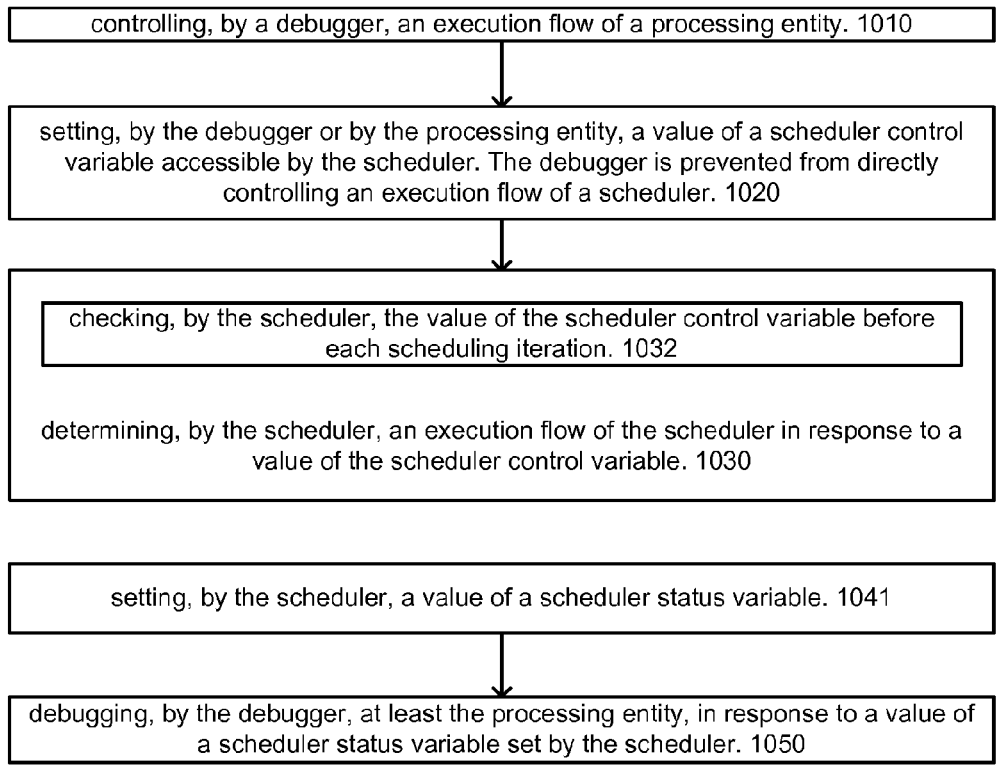
FIG. 11 schematically shows an example of an embodiment of a method.

FIG. 11 schematically shows an example of an embodiment of method 1000 for debugging a system.

Method 1000 can start by stage 1010 and 1020.

Stage 1010 includes controlling, by a debugger, an execution flow of a processing entity. The debugger is prevented from directly controlling an execution flow of a scheduler. Stage 1010 can include controlling the execution flow of more than one processing entity and even of all processing entities of a multiple processing entity system.

The controlling of the execution flow can include, for example, stopping the execution of instructions, freezing the system, executing one or more instructions at a time, and the like.

Stage 1010 can include stopping an execution flow of multiple processing entities by utilizing JTAG interfaces (also known a JTAG controllable interfaces) of the multiple processing entities, or requesting, by the debugger, a first processing entity to control an execution flow of other processing entities. Accordingly, the debugger can communicate directly with multiple processing entities or communicate with one or more processing entities that in turn communicate with one or more other processing entities.

Stage 1020 includes setting, by the debugger or by the processing entity, a value of a scheduler control variable accessible by the scheduler.

Stage 1020 is followed by stage 1030 of determining, by the scheduler, an execution flow of the scheduler in response to a value of the scheduler control variable.

Stage 1030 can include stage 1032 of checking, by the scheduler, the value of the scheduler control variable before each scheduling iteration. Thus, if the scheduler control variable indicates that the scheduler should not execute the next scheduling iteration the scheduler can stop. Thus, the scheduler can be controlled without a dedicated debugger but rather controlled in an indirect manner.

Method 1000 can also include stage 1040 of setting, by the scheduler, a value of a scheduler status variable.

Stage 1040 can be followed by stage 1050 of debugging, by the debugger, at least the processing entity, in response to a value of a scheduler status variable set by the scheduler.

Figure 12:
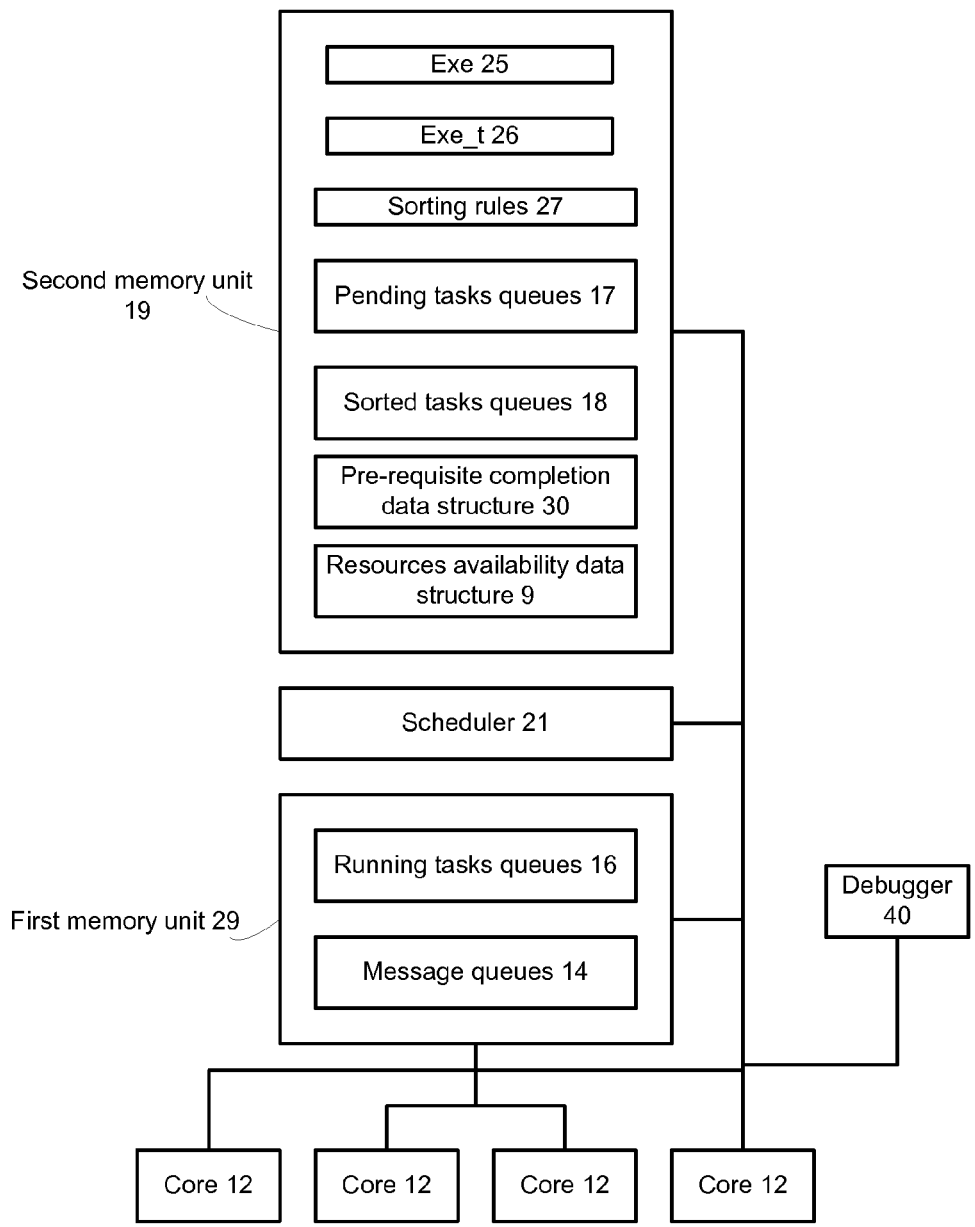
FIG. 12 schematically shows an example of an embodiment of a method.

FIG. 12 schematically shows an example of an embodiment of system 112. System 112 includes debugger 40, scheduler 21 and at least one processing entity such as core 12.

Debugger 40 can debug processing entities 12 but not scheduler 21. Scheduler 21 can be a multiple purpose entity such as multiple purpose entity 20 of FIG. 1.

Debugger 40 can control an execution flow of the processing entity but is not adapted to directly control an execution flow of scheduler 21. In other words, debugger 40 can debug processing entities 12 but can not debug scheduler 21. It may even not be capable of directly accessing scheduler 21.

Debugger 40, and additionally or alternatively, processing entity 12 are adapted to update a value of a scheduler control variable (such as exe_t 26) that is accessible by scheduler 21.

Scheduler 21 is adapted to determine an execution flow of scheduler 21 in response to a value of the scheduler control variable.

Scheduler 21 can also set a value of a scheduler status variable (such as exe 25).

Scheduler 21 can check the value of the scheduler control variable before each scheduling iteration.

Debugger 40 is adapted to control the execution flow of multiple processing entities.

Debugger 40 can stop the execution flow of multiple processing entities by utilizing JTAG interfaces of the multiple processing entities.

Debugger 40 can request, a first processing entity (out of cores 12) to control an execution flow of other processing entities.

Debugger 40 can debug, at least the processing entity, in response to a value of a scheduler status variable set by scheduler 21. If, for example the variable indicates that the scheduler 21 is running in its normal mode (exe=run) then the debugger can determine to wait until scheduler 21 changes its state to a debugging mode (exe=non-run) before debugging processing entities 12.

Any stages of method 900, method 1000 or a combination thereof can be executed by a computer (such as a processing entity, a scheduler or both) that executed instructions. The instructions can be stored in a computer readable medium of a computer program product. The computer readable medium can store instructions for: controlling, by a debugger, an execution flow of a processing entity; wherein the debugger is prevented from directly controlling an execution flow of a scheduler; setting, by the debugger or the processing entity, a value of a scheduler control variable accessible by the scheduler; and determining, by the scheduler, an execution flow of the scheduler in response to a value of the scheduler control variable.

The computer readable medium can store instructions for setting, by the scheduler, a value of a scheduler status variable.

The computer readable medium can store instructions for checking, by the scheduler, the value of the scheduler control variable before each scheduling iteration.

The computer readable medium can store instructions for controlling the execution flow of multiple processing entities by the debugger.

The computer readable medium can store instructions for stopping the execution flow of multiple processing entities by utilizing JTAG interfaces of the multiple processing entities.

The computer readable medium can store instructions for requesting, by the debugger, a first processing entity to control an execution flow of other processing entities.

The computer readable medium can store instructions for debugging, by the debugger, at least the processing entity, in response to a value of a scheduler status variable set by the scheduler.

Any combination of any methods out of methods 500, 600, 700, 800, 900, 1000 and 110 can be provided.

Any combination of any stages of any method out of methods 500, 600, 700, 800, 900, 1000 and 110 can be provided.

A computer program product can include a computer readable medium that stores instructions for executing any methods out of methods 500, 600, 700, 800, 900, 1000 and 110 can be provided.

A computer program product can include a computer readable medium that stores instructions for executing any combination of any stages of any method out of methods 500, 600, 700, 800, 900, 1000 and 110 can be provided.

Any combination of any systems out of systems 11, 13, 112 and 114 can be provided.

Any combination of any components of any system out of systems 11, 13, 112 and 114 can be provided.

Conveniently, the systems out of systems 11, 13, 112 and 114 are integrated circuits such as but not limited to system on chip integrated circuits.

Although the invention has been described with respect to specific conductivity types or polarity of potentials, skilled artisans appreciate that conductivity types and polarities of potentials may be reversed.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for debugging a system, the method comprises:
   checking if a scheduler status variable indicates a scheduler is in a normal mode, such that the scheduler status variable indicates that the scheduler, in the normal mode, executes at least one scheduling iteration;
   updating, during each of a plurality of scheduling iterations in the normal mode, a queue starvation watermark value of each of a plurality of task data structures that is not eligible to move to a running tasks queue, until a first queue starvation watermark value of a first task data structure of the plurality of the task data structures reaches a queue starvation watermark threshold;
   generating a task starvation indication if during an additional number of additional scheduling iterations, the first task data structure is still prevented from being moved to the running tasks queue, wherein the additional number is responsive to a task starvation watermark;
   freezing sorted tasks queues that do not store the first task data structure or otherwise ignoring the task data structures stored in other sorted tasks queues during the additional number of the scheduling iterations;
   controlling, by a debugger, a processing entity execution flow of a processing entity;
   setting, by the debugger or the processing entity, a value of a scheduler control variable accessible by the scheduler, wherein the debugger can set the value of the scheduler control variable and the processing entity can set the value of the scheduler control variable; and
   determining, by the scheduler, the scheduler execution flow of the scheduler in response to the setting the value of the scheduler control variable;
   checking if the scheduler status variable indicates the scheduler is not in the normal mode; and
   performing, by the debugger, a debugging operation in response to the scheduler status variable indicating that the scheduler is not in the normal mode.

2. The method according to claim 1 comprising setting, by the scheduler, a value of the scheduler status variable.

3. The method according to claim 1 comprising checking, by the scheduler, the value of the scheduler control variable before each of the at least one scheduling iteration.

4. The method according to claim 1 wherein the controlling, by the debugger, the processing entity execution flow of the processing entity comprises controlling the processing entity execution flow of multiple processing entities by the debugger, wherein the multiple processing entities comprise the processing entity.

5. The method according to claim 1 comprising stopping the processing entity execution flow of multiple processing entities by utilizing Joint Test Access Group (JTAG) interfaces of the multiple processing entities, wherein the multiple processing entities comprise the processing entity.

6. The method according to claim 1 comprising requesting, by the debugger, the processing entity to control an other processing entities execution flow of other processing entities.

7. The method according to claim 1 wherein the processing entity is a core and wherein the scheduler is a multiple-purpose entity that is disabled from performing a non-scheduler task during the scheduling of a processing entity task.

8. A system having debugging capabilities, the system comprises:
   a processing entity;
   a debugger that is adapted to control a processing entity execution flow of the processing entity;
   a scheduler;
   wherein either one of the debugger or the processing entity is adapted to check if a scheduler status variable indicates that the scheduler is in a normal mode, such that the scheduler status variable indicates that the scheduler, in the normal mode, executes at least one scheduling iteration, to update a value of a scheduler control variable accessible by the scheduler, to check if a scheduler status variable indicates that the scheduler is not in the normal mode, and to perform a debugging operation, wherein the debugger can update the value of the scheduler control variable and the processing entity can update the value of the scheduler control variable; and
   wherein the scheduler is adapted to determine the scheduler execution flow of the scheduler in response to the value of the scheduler control variable, wherein the system is further adapted to update, during each of a plurality of scheduling iterations, a queue starvation watermark value of each of a plurality of task data structures that is not eligible to move to a running tasks queue, until a first queue starvation watermark value of a first task data structure of the plurality of the task data structures reaches a queue starvation watermark threshold, to generate a task starvation indication if during an additional number of additional scheduling iterations, the first task data structure is still prevented from being moved to the running tasks queue, wherein the additional number is responsive to a task starvation watermark, and to freeze sorted tasks queues that do not store the first task data structure or otherwise ignoring the task data structures stored in other sorted tasks queues during the additional number of the scheduling iterations.

9. The system according to claim 8 wherein the scheduler is adapted to set a value of the scheduler status variable.

10. The system according to claim 8 wherein the scheduler is adapted to check the value of the scheduler control variable before each of the at least one scheduling iteration.

11. The system according to claim 8 wherein the debugger is adapted to control the processing entity execution flow of multiple processing entities, wherein the multiple processing entities comprise the processing entity.

12. The system according to claim 8 wherein the debugger is adapted to stop the processing entity execution flow of multiple processing entities by utilizing JTAG interfaces of the multiple processing entities, wherein the multiple processing entities comprise the processing entity.

13. The system according to claim 8 wherein the debugger is adapted to request, the processing entity to control an other processing entities execution flow of other processing entities.

14. The system according to claim 8 wherein the processing entity is a core and wherein the scheduler is multiple-purpose entity that is disabled from performing a non-scheduler task during the scheduling of a processing entity task.

15. A computer program product that comprises a non-transitory computer readable medium that stores instructions that when executed perform the steps comprising:
   checking if a scheduler status variable indicates a scheduler is in a normal mode, such that the scheduler status variable indicates that the scheduler, in the normal mode, executes at least one scheduling iteration;
   updating, during each of a plurality of scheduling iterations in the normal mode, a queue starvation watermark value of each of a plurality of task data structures that is not eligible to move to a running tasks queue, until a first queue starvation watermark value of a first task data structure of the plurality of the task data structures reaches a queue starvation watermark threshold;
   generating a task starvation indication if during an additional number of additional scheduling iterations, the first task data structure is still prevented from being moved to the running tasks queue, wherein the additional number is responsive to a task starvation watermark;
   freezing sorted tasks queues that do not store the first task data structure or otherwise ignoring the task data structures stored in other sorted tasks queues during the additional number of the scheduling iterations;
   controlling, by a debugger, a processing entity execution flow of a processing entity;
   setting, by the debugger or the processing entity, a value of a scheduler control variable accessible by the scheduler, wherein the debugger can set the value of the scheduler control variable and the processing entity can set the value of the scheduler control variable; and
   determining, by the scheduler, the scheduler execution flow of the scheduler in response to the setting the value of the scheduler control variable;
   checking if the scheduler status variable indicates the scheduler is not in the normal mode; and
   performing a debugging operation.

16. The computer program product according to claim 15 comprising instructions, that when executed perform setting, by the scheduler, a value of the scheduler status variable.

17. The computer program product according to claim 15 comprising instructions, that when executed perform checking, by the scheduler, the value of the scheduler control variable before each of the at least one scheduling iteration.

18. The computer program product according to claim 15 comprising instructions, that when executed perform controlling the processing entity execution flow of multiple processing entities by the debugger, wherein the multiple processing entities comprise the processing entity.

* * * * *